(12) United States Patent  
Qiu

(10) Patent No.: US 9,000,668 B2  
(45) Date of Patent: Apr. 7, 2015

(54) SELF-ADAPTIVE LED FLUORESCENT LAMP

(71) Applicant: Ningbo Futai Electric Limited, Ningbo, Zhejiang (CN)

(72) Inventor: Fujun Qiu, Ningbo (CN)

(73) Assignee: Ningbo Futai Electric Limited, Ningbo (CN)

( * ) Notice: Subject to any disclaimer, the term of this patent is extended or adjusted under 35 U.S.C. 154(b) by 3 days.

(21) Appl. No.: 14/009,405

(22) PCT Filed: Oct. 8, 2012

(86) PCT No.: PCT/CN2012/082596
§ 371 (c)(1),
(2) Date: Oct. 2, 2013

(87) PCT Pub. No.: WO2013/177884
PCT Pub. Date: Dec. 5, 2013

(65) Prior Publication Data
US 2014/0192526 A1  Jul. 10, 2014

(30) Foreign Application Priority Data

May 31, 2012 (CN) .......................... 2012 1 0174370

(51) Int. Cl.
*H01J 7/44* (2006.01)
*H05B 37/02* (2006.01)
*F21K 99/00* (2010.01)
*H05B 33/08* (2006.01)
*F21V 29/00* (2006.01)

(52) U.S. Cl.
CPC ............ *F21K 9/175* (2013.01); *H05B 33/0812* (2013.01); *F21V 29/004* (2013.01); *H05B 33/0824* (2013.01); *Y02B 20/383* (2013.01); *Y02B 20/386* (2013.01)

(58) Field of Classification Search
USPC ........................... 315/31, 246, 291, 294, 297
See application file for complete search history.

(56) References Cited

U.S. PATENT DOCUMENTS

| 8,093,823 B1 * | 1/2012 | Ivey et al. ..................... 315/246 |
| 8,653,984 B2 * | 2/2014 | Ivey et al. ................... 340/815.4 |
| 2011/0149548 A1 * | 6/2011 | Yang et al. ...................... 362/84 |

(Continued)

*Primary Examiner* — Don Le
(74) *Attorney, Agent, or Firm* — Jacobson Holman PLLC; Jiwen Chen

(57) ABSTRACT

The invention discloses an self-adaptive LED fluorescent lamp, comprising: a housing comprising a lampshade and a radiator fastened with each other, a Printed Circuit Board (PCB) consisting of one or more LED lamp sets and LED driving control units, and lamp caps sleeved on two sides of the housing; the LED driving control unit comprises a voltage detection module, an intelligent switching module and a linear constant current module; the voltage detection module comprises a first resistor and a second resistor, which are connected between two output ends of the rectifier filter module for voltage division, and a first capacitor connected with the second resistor in parallel; the intelligent switching module is connected with a common end of the first resistor and the second resistor, the output of the intelligent switching module is connected with a plurality of LED lamp sets, and each of the LED lamps is connected with a compensation resistor in series; and the linear constant current module consists of two IC linear driving chips. In the invention, the number of the LED lamps in serial connection is automatically changed by automatically detecting the output voltage of the rectifier, to reach the optimal driving efficiency, so as to ensure normal operating under any voltage.

3 Claims, 6 Drawing Sheets

(56) References Cited

U.S. PATENT DOCUMENTS

| | | | |
|---|---|---|---|
| 2012/0008315 A1* | 1/2012 | Simon et al. | 362/217.13 |
| 2012/0043892 A1* | 2/2012 | Visser et al. | 315/121 |
| 2012/0319582 A1* | 12/2012 | Shan | 315/77 |

* cited by examiner

SELF-ADAPTIVE LED FLUORESCENT LAMP

This is a U.S. national stage application of PCT Application No. PCT/CN2012/082596 under 35 U.S.C. 371, filed Oct. 8, 2012 in Chinese, claiming the priority benefit of Chinese Application No. 201210174370.8, filed May 31, 2012 in Chinese, which is hereby incorporated by reference.

TECHNICAL FIELD

The present invention relates to a power drive system of a fluorescent lamp, and in particular to a self-adaptive Light Emitting Diode (LED) fluorescent lamp.

BACKGROUND

The driving power supplies of fluorescent lamps in the current mainstream market are provided externally or embedded in an aluminum tube chase. LEDs have been widely applied in lighting due to its high light emitting efficiency, energy saving, long service life, adjustable brightness, safety, reliability and other advantages. Therefore, if there is a need to convert a traditional fluorescent lamp into an LED lamp with an external power supply, the wiring mode of the primary fluorescent lamp holder needs to be re-modified (because the driving mode of the LED is different from that of the traditional fluorescent lamp), resulting in technical difficulty and high replacement cost for the replacement of a traditional fluorescent lamp with an LED lamp. Meanwhile, as a large-angle light emitting fluorescent lamp occupies ⅓ space of an aluminum tube, it is infeasible to embed the power supply in the aluminum tube case because the aluminum tube is low in height. A driving mode of embedding the power supply on two sides of the tube end is thus proposed. However, if such driving mode is adopted, the power supply has lots of deficiencies in power capacity and electrical appliance performance due to its limited length, such as, limited power, electromagnetic interference and high cost. For example, Patent No. 20072018726.5 disclosed an LED constant current driving circuit, comprising a power supply module connected to both commercial power and a lamp set comprising one or more diodes, characterized in that: the power supply module comprises an AD input end, a rectification circuit, an isolating transformer and a constant current output circuit that are serially connected; and the output end of the constant current output circuit is connected with the lamp set. Because such power supply can be connected to commercial power voltage only, the linear matching capability is poor when a plurality of LEDs are driven with constant current. The driving effect may be best when an output voltage is slightly higher than the voltage of the LED lamp. However, with the consideration that too low efficiency or failure of constant current may be caused by voltage fluctuation in the practical application environment and that there are various fluorescent lamp rectifiers at present with varied output voltages, for example, rectifiers with 180VAC output and 130VAC output available in Japan, such driving circuit does not seem appropriate anymore. Such driving circuit may cause insufficient driving voltage to the LED, thereby resulting in insufficient brightness or low brightness, reducing the application safety, and shortening the service life.

SUMMARY OF THE INVENTION

The object of the present invention is to provide a self-adaptive LED fluorescent lamp with effective linear matching, small size, safety and reliability for use, low cost, and long service life, to overcome the above deficiencies in the prior art.

To achieve the above object, the self-adaptive LED fluorescent lamp designed according to the present invention comprises a housing, a Printed Circuit Board (PCB) and two lamp caps, the housing comprising a lampshade and a radiator fastened with each other, each one of the two lamp caps being sleeved on two sides of the housing, one or more LED lamp sets and LED driving control units being arranged on the PCB, a heat conductive double-sided silicone tape being stuck between the PCB and the radiator, the LED driving control unit comprising an input signal module, a protection module and a rectifier filter module, the LED driving control unit further comprising a voltage detection module arranged behind the rectifier filter module to detect and judge the voltage, an intelligent switching module connected with the voltage detection module to achieve intelligent switchover of the LED lamps, and a linear constant current module connected with the intelligent switching module.

To provide a detection voltage, the voltage detection module comprises a first resistor and a second resistor, which are connected between a positive output end and a negative output end of the rectifier filter module for voltage division, and a first capacitor connected with the second resistor in parallel.

To achieve effective performance matching, reduce the cost and extend the service life of the circuit, the intelligent switching module comprises a first relay, a second relay and a field effect transistor, a grid end G of the field effect transistor is connected with a common end of the first resistor and the second resistor, a drain end D of the field effect transistor is connected with a negative end of the second relay, a source end S is connected with a negative output end of the rectifier filter module, the output of the intelligent switching module is connected with one or more LED lamp sets, in each lamp set, one or more LED lamps are connected in series, and each LED lamp is connected with one or more compensation resistors in series.

In order to improve the application safety and keep an Integrated Circuit (IC) away from too high power, the linear constant current module comprises two IC linear driving chips, the input end of each of the IC linear driving chips is connected with a second normally open end of the second relay, and the output end thereof is connected with the negative output end of the rectifier filter module.

To further achieve the performance matching and reduce cost, a first diode is connected between a first normally closed end of the first relay and a positive output end of the rectifier filter module, a first normally open end of the first relay is connected with the positive output end of the rectifier filter module, and a first LED lamp set and a second LED lamp set are in parallel connected between a second normally closed end of the first relay and the positive output end of the rectifier filter module; a third LED lamp set is connected between a second coil end and a first coil end of the first relay, and the common end of the third LED lamp set and the second coil end of the first relay is connected with a first normally closed end of the second relay; a third resistor and a third diode are in series connected between a positive voltage end of the first relay and the positive output end of the rectifier filter module, a fourth diode is connected between a negative voltage end of the first relay and the drain end of the field effect transistor, and a fourth LED lamp set is connected between a first normally open end of the second relay and a second normally closed end of the first relay; a first coil end of the second relay is connected with the second normally closed end of the first relay, a fifth LED lamp set is connected between a second normally open end of the second relay and the second coil end of the first relay, a sixth LED lamp set is connected between a second normally closed end of the second relay and the second coil end of the first relay, and a second diode is connected between the second normally closed end and the second normally open end of the second relay.

In order to further activate the protection function to extend the service life, the protection module comprises a short circuit protection module, an over-voltage protection module and an overheat protection module. The short circuit protection module and the over-voltage protection module are serially connected between the input signal module and the rectifier filter module, and the overheat protection module is implemented by the IC linear driving chips.

In the self-adaptive LED fluorescent lamp obtained by the present invention, a divider resistor R5 and a divider resistor R6 are connected behind the rectifier filter module to detect the output voltage of a rectifier. When the output voltage of the rectifier is normal, the voltage on R5 cannot reach the turn-on voltage of the field effect transistor Q, the positive output end of the rectifier filter module is directly connected to the first normally closed end of the relay, as the first normally closed end is connected with the first coil, the relay is turned on, so the circuit is turned on normally. When the output voltage rises, the voltage on the R5 correspondingly rises, so that Vgs (i.e., VR5) of the field effect transistor Q is turned on when a certain voltage value is reached to cause the relay to form a loop, converting the relay from TO-ON to TO-OFF, and changing the original parallel-series conversion, thereby automatically changing the number of the LED lamps in serial connection by automatically detecting the output voltage of the rectifier to reach the optimal driving efficiency, and achieving the advantages of effective linear matching, small size, safe and reliable application, low cost and long service life.

DETAILED DESCRIPTION OF THE EMBODIMENTS

The present invention will be further described as below in combination with the accompanying drawings and embodiments.

Embodiment

Figure 1:
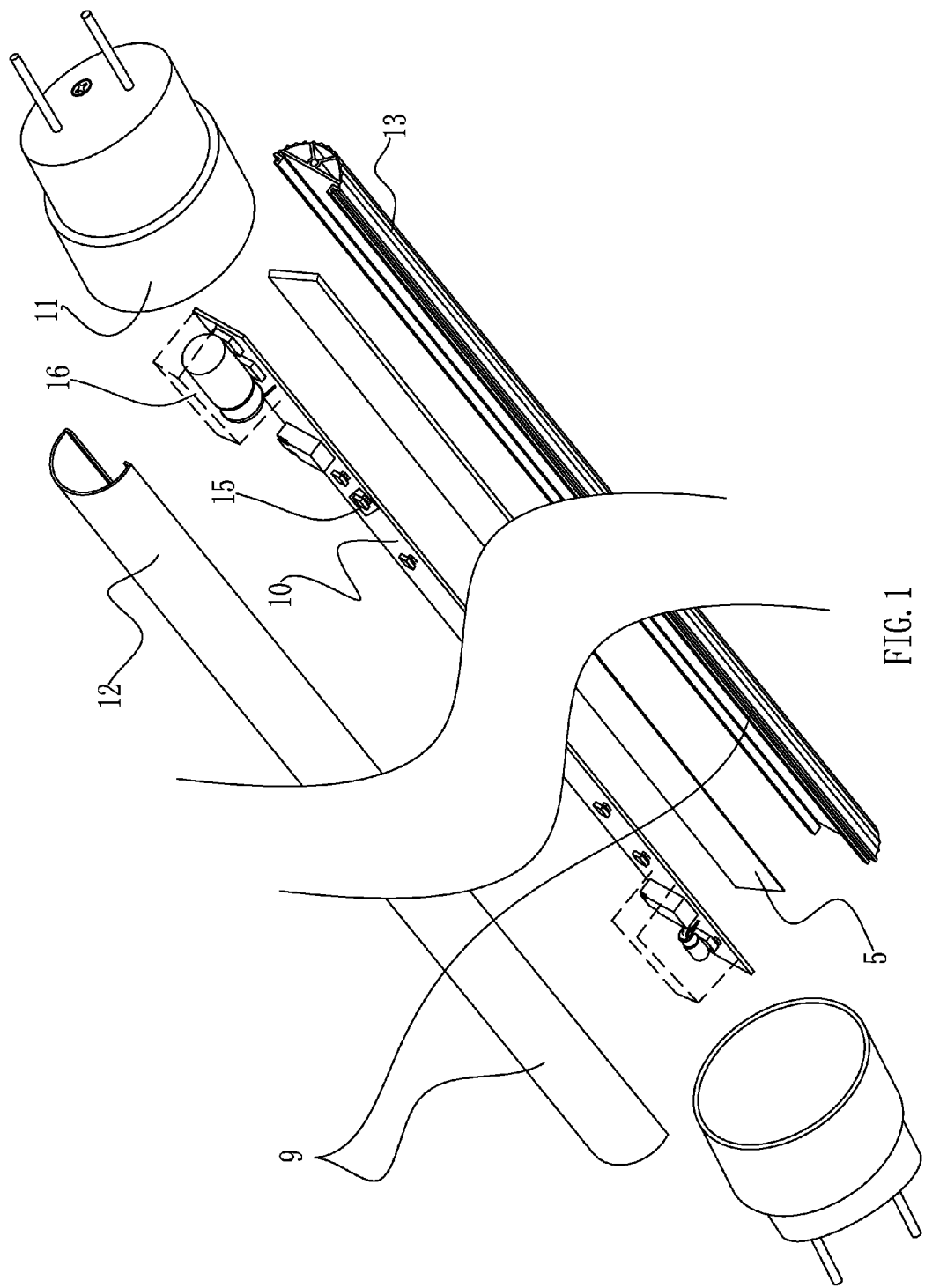
FIG. 1 is an exploded view of an overall structure of the present invention.
Figure 2:
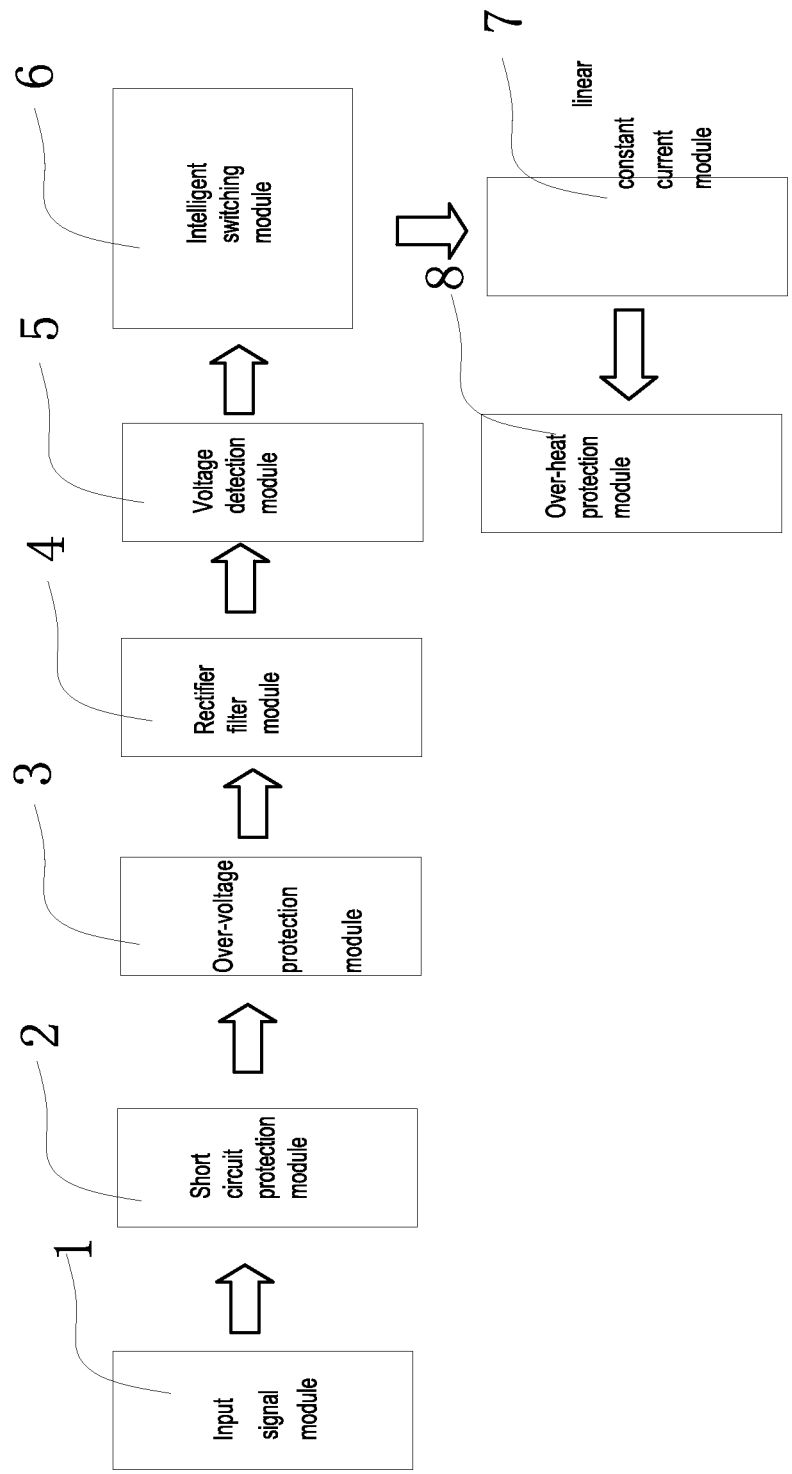
FIG. 2 is a structure diagram of a driving control unit of FIG. 1.
Figure 3:
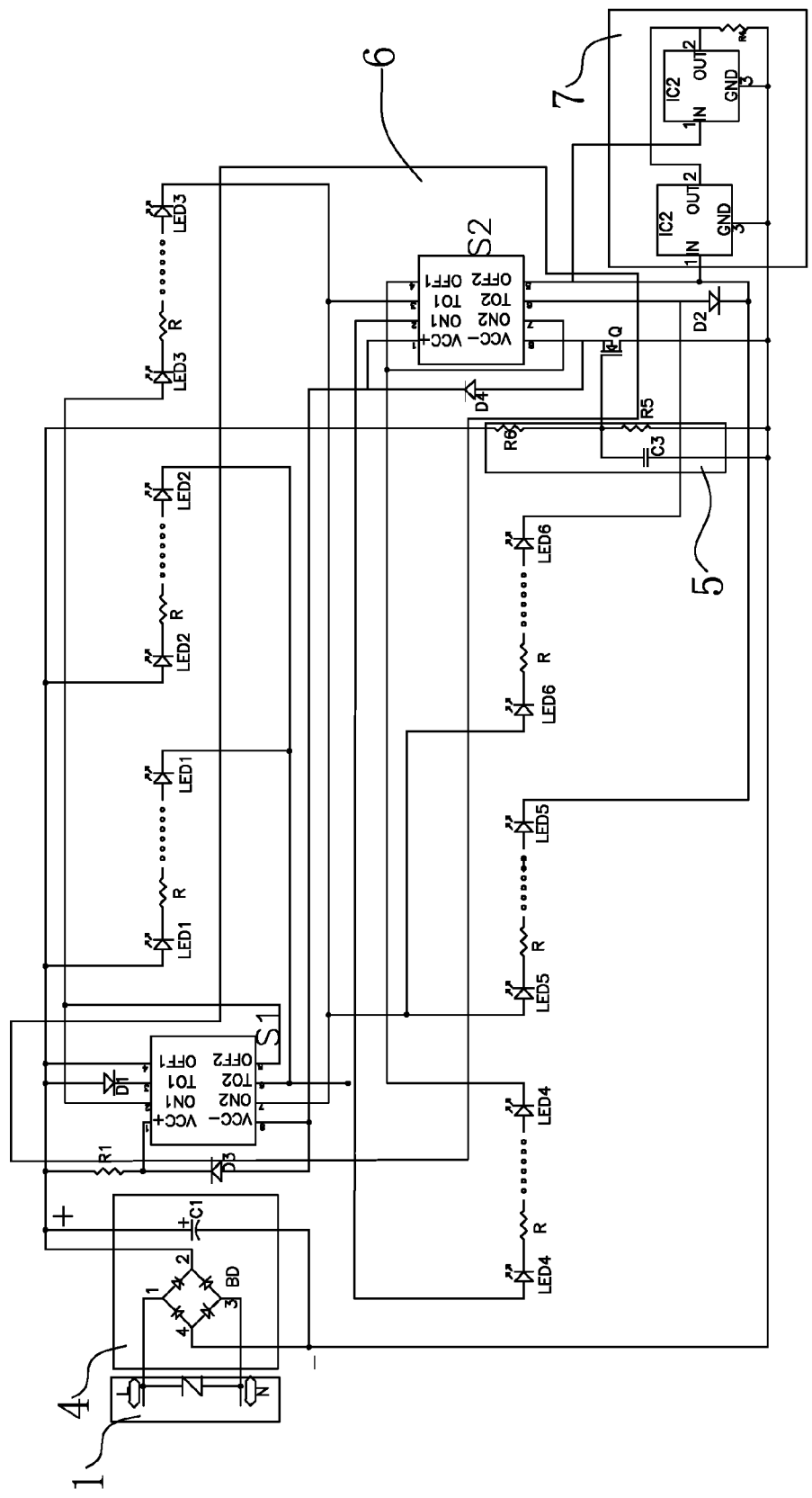
FIG. 3 is a schematic diagram of the driving control unit of FIG. 1.

In FIG. 1, FIG. 2, and FIG. 3, the self-adaptive LED fluorescent lamp provided by the present invention comprises a housing 9, a PCB 10 and two lamp caps 11, the housing 9 comprises a lampshade 12 and a radiator 13 that are fastened with each other, each one of the two lamp caps 11 is sleeved on two sides of the housing 9, one or more LED lamp sets 15 and LED driving control units 16 are arranged on the PCB 10, a heat conductive double-sided silicone tape 14 is stuck between the PCB 10 and the radiator, the LED driving control unit 16 comprises an input signal module 1, a protection module and a rectifier filter module 4, the LED driving control unit 16 further comprises a voltage detection module 5 arranged behind the rectifier filter module 4 to detect and judge the voltage, an intelligent switching module 6 connected with the voltage detection module 5 to achieve intelligent switchover of the LED lamps, and a linear constant current module 7 connected with the intelligent switching module 6; the voltage detection module 5 comprises a first resistor R5 and a second resistor R6, which are connected between a positive output end and a negative output end of the rectifier filter module 4 for voltage division, and a first capacitor C3 connected with the second resistor R6 in parallel; the intelligent switching module 6 comprises a first relay S1, a second relay S2 and a field effect transistor Q, a grid end G of the field effect transistor Q is connected with a common end of the first resistor R5 and the second resistor R6, a drain end D of the field effect transistor Q is connected with a negative end VCC− of the second relay S2, a source end S of the field effect transistor Q is connected with a negative output end of the rectifier filter module 4, the output of the intelligent switching module 6 is connected with one or more LED lamp sets 15, in each lamp set 15, one or more LED lamps are connected in series, and each LED lamp is connected with one or more compensation resistors R in series; and, the linear constant current module 7 comprises two IC linear driving chips. In order to keep the IC away from too high power, two ICs are provided for the purpose of power division, the input end IN of each of the IC linear driving chips is connected with a second normally open end OFF2 of the second relay S2, and the output end OUT thereof is connected with the negative output end of the rectifier filter module 4, and meanwhile, the ground end GND of each of the IC linear driving chips is connected with the negative output end of the rectifier filter module.

A first diode D1 is connected between a first normally closed end TO1 of the first relay S1 and a positive output end of the rectifier filter module 4, with a positive end of the first diode D1 being connected with the positive output end of the rectifier filter module 4, a first normally open end OFF1 of the first relay S1 is connected with the positive output end of the rectifier filter module 4, and a first LED lamp set and a second LED lamp set are in parallel connected between a second normally closed end TO2 of the first relay S1 and the positive output end of the rectifier filter module 4; a third LED lamp set is connected between a second coil end ON2 and a first coil end ON1 of the first relay S1, and the common end of the third LED lamp set and the second coil end ON2 of the first relay S1 is connected with a first normally closed end TO1 of the second relay S2; a third resistor R1 and a third diode D3 are in series connected between a positive voltage end VCC− of the first relay S1 and the positive output end of the rectifier filter module 4, a positive end of the third diode D3 is connected with the negative voltage end VCC− of the first relay S1, and the common end of the third resistor R1 and the third diode D3 is connected with a positive voltage end VCC+ of the first relay S1; a fourth diode D4 is connected between the negative voltage end VCC− of the first relay S1 and the drain end D of the field effect transistor Q, a positive end of the fourth diode D4 is connected with the drain end D of the field effect transistor Q, and the negative voltage end VCC− of the first relay S1 is connected with a positive voltage end of the second relay S2; a fourth LED lamp set is connected between a first normally open end OFF1 of the second relay S2 and a second normally closed end TO2 of the first relay S1, and a second coil end ON2 of the second relay S2 is connected with the first normally closed end TO1 of the first relay S1; a fifth LED lamp set is connected between a second normally open end OFF2 of the second relay S2 and the second coil end ON2 of the first relay S1, a sixth LED lamp set is connected between a second normally closed end TO2 of the second relay S2 and the second coil end ON2 of the first relay S1, a second diode D2 is connected between the second normally closed end TO2 of the second relay S2 and the second normally open end OFF2 of the second relay S2, and a positive end of the second diode D2 is connected with the second normally closed end TO2 of the second relay S2.

The protection module comprises a short circuit protection module 2, an over-voltage protection module 3 and an over-heat protection module 8, the short circuit protection module 2 and the over-voltage protection module 3 are in order connected between the input signal module 1 and the rectifier filter module 4, and the overheat protection module 8 is implemented by the IC linear driving chips.

Figure 4:
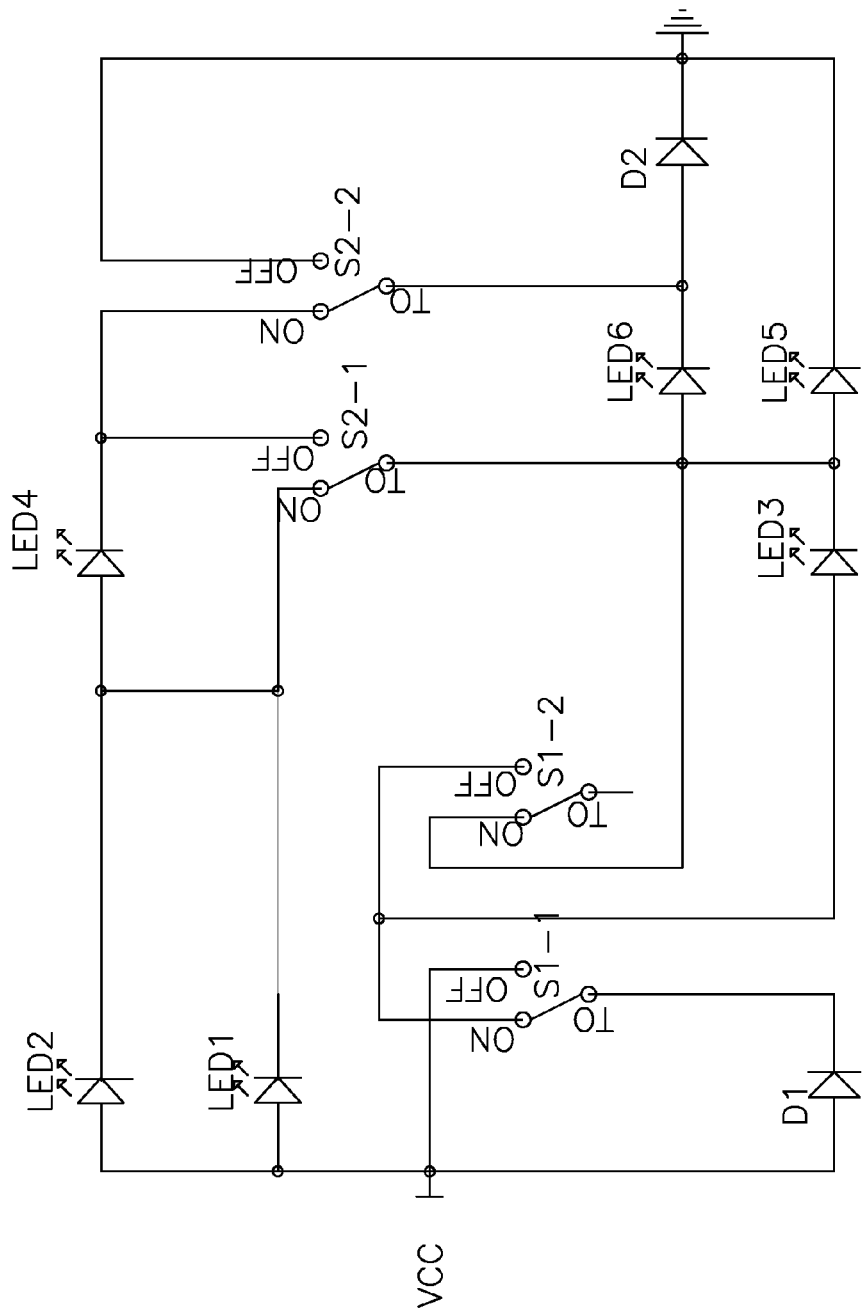
FIG. 4 is a simplified schematic diagram after removing a control circuit from FIG. 3.
Figure 5:
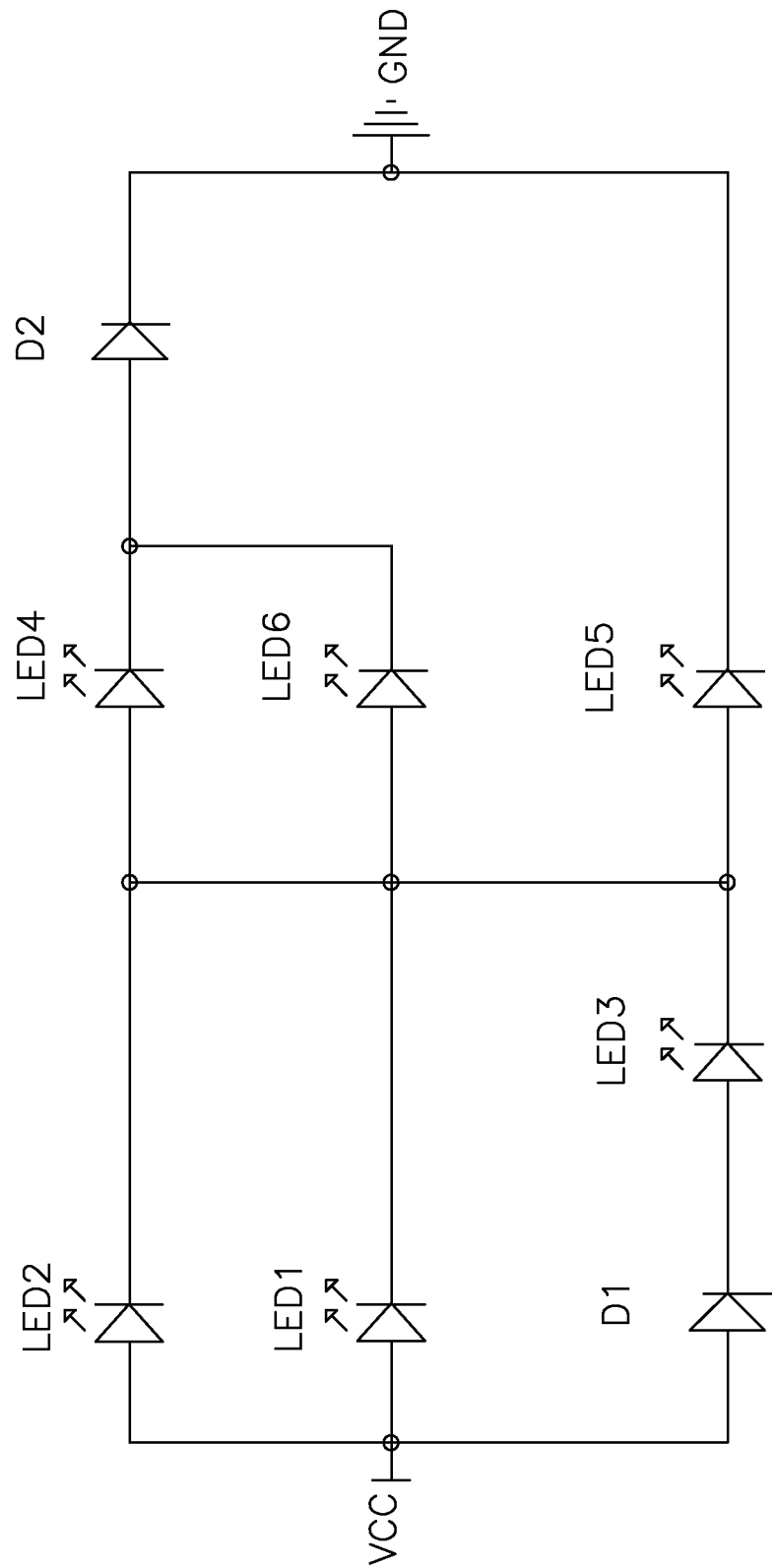
FIG. 5 is a simplified schematic diagram of FIG. 4 in TO-ON state.
Figure 6:
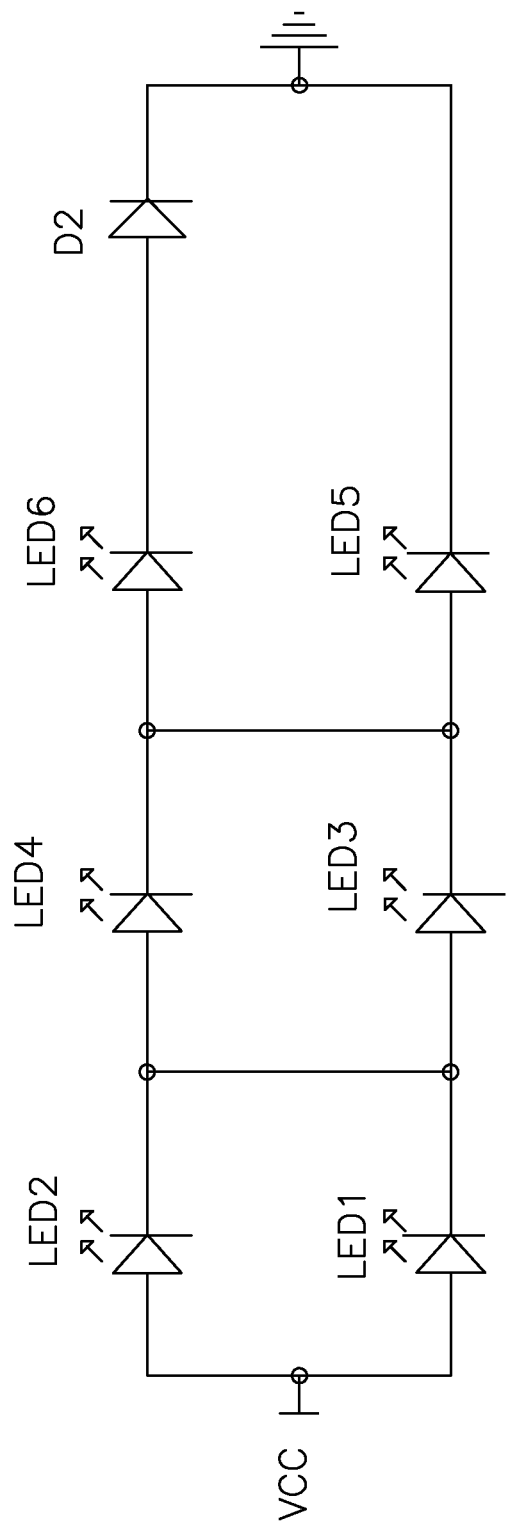
FIG. 6 is a simplified schematic diagram of FIG. 4 in TO-OFF state.

The specific working process is as follows: when an external input voltage is supplied to a fluorescent lamp, in the case that the external input voltage is in normal voltage fluctuation, after the external input voltage passes through the rectifier filterer, the output voltage of a rectifier is detected by the divider resistor R5 and the divider resistor R6, at this time, a circuit is obtained as shown in FIG. 4 which is a simplified schematic diagram after removing a control circuit. At this time, the voltage on the divider resistor R5 cannot reach the turn-on voltage of the field effect transistor Q. However, as the embedded coils of both the first relay and the second relay are in normally closed state, the output voltage is connected to the first normally closed end TO1 of the first relay S1 through the first diode D1, connected to the first coil end of the second relay S2 through the first LED lamp set, and connected to the first normally closed end TO1 of the second relay S2 through the third LED lamp set, in this mode, the circuit also forms a loop. Therefore, the series-parallel connection mode of the LEDs in the circuit is as shown in FIG. 5. When the output voltage of the rectifier is too high, the output voltage of the rectifier is detected by the divider resistor R5 and the divider resistor R6. The voltage on the R5 correspondingly rises, so that the voltage Vgs of the field effect transistor Q rises. The field effect transistor will be instantly turned on when the Vgs rises to a certain voltage value. After the field effect transistor Q is turned on, the relays are converted from normally closed state to normally open state, at this time, a loop is also formed, so that the working state of the relays are switched from TO-ON to TO-OFF, thereby changing the original series-parallel connection. At this time, the series-parallel mode of the LEDs in the circuit is as shown in FIG. 6. In this way, the linear matching of the circuit is realized despite how the voltage of the peripheral rectifier changes, to ensure the circuit to emit light normally. The third diode D3 and the fourth diode D4 in the circuit protect the relay in the circuit due to their unilateral conductivity.

The invention claimed is:

1. A self-adaptive LED fluorescent lamp, comprising a housing (9), a PCB (10) and two lamp caps (11), the housing (9) comprising a lampshade (12) and a radiator (13) that are fastened with each other, each one of the two lamp caps (11) being sleeved on two sides of the housing (9), one or more LED lamp sets (15) and LED driving control units (16) being arranged on the PCB (10), a heat conductive double-sided silicone tape (14) being stuck between the PCB (10) and the radiator, the LED driving control unit (16) comprising an input signal module (1), a protection module and a rectifier filter module (4), wherein the LED driving control unit (16) further comprises a voltage detection module 5 arranged behind the rectifier filter module (4) to detect and judge the voltage, an intelligent switching module (6) connected with the voltage detection module (5) to achieve intelligent switchover of the LED lamps, and a linear constant current module (7) connected with the intelligent switching module (6); the voltage detection module (5) comprises a first resistor (R5) and a second resistor (R6), which are connected between a positive output end and a negative output end of the rectifier filter module (4) for voltage division, and a first capacitor C3 connected with the second resistor (R6) in parallel; the intelligent switching module (6) comprises a first relay (S1), a second relay (S2) and a field effect transistor (Q), a grid end G of the field effect transistor (Q) is connected with a common end of the first resistor (R5) and the second resistor (R6), a drain end D of the field effect transistor (Q) is connected with a negative end (VCC−) of the second relay (S2), a source end S of the field effect transistor (Q) is connected with a negative output end of the rectifier filter module (4), the output of the intelligent switching module (6) is connected with one or more LED lamp sets (15), in each lamp set (15), one or more LED lamps are connected in series, and each LED lamp is connected with one or more compensation resistors (R) in series; and, the linear constant current module (7) comprises two IC linear driving chips, the input end (IN) of each of the IC linear driving chips is connected with a second normally open end (OFF2) of the second relay (S2), and the output end (OUT) thereof is connected with the negative output end of the rectifier filter module (4).

2. The self-adaptive LED fluorescent lamp according to claim 1, wherein a first diode (D1) is connected between a first normally closed end (TO1) of the first relay (S1) and a positive output end of the rectifier filter module (4), a first normally open end (OFF1) of the first relay (S1) is connected with the positive output end of the rectifier filter module (4), and a first LED lamp set and a second LED lamp set are in parallel connected between a second normally closed end (TO2) of the first relay (S1) and the positive output end of the rectifier filter module (4); a third LED lamp set is connected between a second coil end (ON2) and a first coil end (ON1) of the first relay (S1), and the common end of the third LED lamp set and the second coil end (ON2) of the first relay (S1) is connected with a first normally closed end (TO1) of the second relay (S2); a third resistor (R1) and a third diode (D3) are in series connected between a positive voltage end (VCC−) of the first relay (S1) and the positive output end of the rectifier filter module (4), a fourth diode (D4) is connected between the negative voltage end (VCC−) of the first relay (S1) and the drain end (D) of the field effect transistor (Q), and a fourth LED lamp set is connected between a first normally open end (OFF1) of the second relay (S2) and a second normally closed end (TO2) of the first relay (S1); a first coil end (ON1) of the second relay (S2) is connected with the second normally closed end (TO2) of the first relay (S1), a fifth LED lamp set is connected between a second normally open end (OFF2) of the second relay (S2) and the second coil end (ON2) of the first relay (S1), a sixth LED lamp set is connected between a second normally closed end (TO2) of the second relay (S2) and the second coil end (ON2) of the first relay (S1), and a second diode (D2) is connected between the second normally closed end (TO2) of the second relay (S2) and the second normally open end (OFF2) of the second relay (S2).

3. The self-adaptive LED fluorescent lamp according to claim 1, wherein the protection module comprises a short circuit protection module (2), an over-voltage protection module (3) and an overheat protection module (8), the short circuit protection module (2) and the over-voltage protection module (3) are serially connected between the input signal module (1) and the rectifier filter module (4), and the overheat protection module (8) is implemented by the IC linear driving chips.

* * * * *